United States Patent
Sorrentino (10) Patent No.: US 9,107,223 B2
(45) Date of Patent: Aug. 11, 2015

(54) METHODS, SYSTEMS AND DEVICES FOR DECOUPLED INTERFERENCE RANDOMIZATION FOR UPLINK REFERENCE SIGNALS

(71) Applicant: Telefonaktiebolaget L M Ericsson (publ), Stockholm (SE)

(72) Inventor: Stefano Sorrentino, Solna (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 210 days.

(21) Appl. No.: 13/896,893

(22) Filed: May 17, 2013

(65) Prior Publication Data

US 2013/0315212 A1   Nov. 28, 2013

Related U.S. Application Data

(60) Provisional application No. 61/650,660, filed on May 23, 2012.

(51) Int. Cl.
| | |
|---|---|
| *H04J 11/00* | (2006.01) |
| *H04W 72/08* | (2009.01) |
| *H04J 13/00* | (2011.01) |
| *H04L 5/00* | (2006.01) |

(52) U.S. Cl.
CPC .......... *H04W 72/082* (2013.01); *H04J 11/005* (2013.01); *H04J 11/0026* (2013.01); *H04J 13/0062* (2013.01); *H04L 5/0048* (2013.01); *H04L 5/0073* (2013.01); *H04J 2211/005* (2013.01); *H04L 5/0012* (2013.01); *H04L 5/0016* (2013.01); *H04L 5/0035* (2013.01)

(58) Field of Classification Search
None
See application file for complete search history.

(56) References Cited

U.S. PATENT DOCUMENTS

| | | |
|---|---|---|
| 2013/0201931 A1 | 8/2013 | Noh et al. |
| 2015/0023275 A1* | 1/2015 | Kim et al. ............ 370/329 |
| 2015/0036607 A1* | 2/2015 | Park et al. ............ 370/329 |

FOREIGN PATENT DOCUMENTS

| | | |
|---|---|---|
| EP | 2 571 182 A2 | 3/2013 |
| KR | 10-2011-0125618 A | 11/2011 |
| WO | WO 2009/023692 A2 | 2/2009 |

OTHER PUBLICATIONS

International Search Report and Written Opinion of International Searching Authority, PCT Application No. PCT/IB2013/054242, Oct. 31, 2013.
ETRI "PUCCH enhancement for CoMP", Agenda Item 7.5.6.3 Uplink control signalling, 3GPP TSG RAN WG1 Meeting #68bis, Jeju, Korea, Mar. 26-30, 2012, 2 pp.

(Continued)

*Primary Examiner* — Mohammad Adhami
(74) *Attorney, Agent, or Firm* — Myers Bigel Sibley & Sajovec, P.A.

(57) ABSTRACT

Interference between reference signals from user equipments in a wireless network, the method may be reduced by using a received time shift value from a node in the wireless network. An interference randomization technique may be applied to a reference signal and a sequence may be generated based on the reference signal to which the interference randomization technique has been applied. A processed reference signal may be derived by applying a time shift based on the time shift value to the sequence. The processed reference signal may be transmitted to the node. Related systems, methods, nodes and wireless devices are also described.

12 Claims, 6 Drawing Sheets

(56) References Cited

OTHER PUBLICATIONS

Huawei et al., "Remaining details of PUSCH DMRS for UL CoMP", Agenda Item 7.5.6.1,1, 3GPP TSG RAN WG1 Meeting #69, Prague, Czech Republic, May 21-25, 2012, 7 pp.

Ericsson et al, "Details on UL DMRS", Agenda Item 7.5.6.1, Dresden, Germany, Feb. 6-10, 2012, 6 pp.

LG Electronics, "Considerations on CSI-RS configuration for CoMP", 3GPP TSG RAN WG1 Meeting #69, Agenda item 7.5.4, R1-122298, Prague, Czech Republic May 21-25, 2012, 4 pp.

Huawei et al, "Remaining details of CSI-RS", 3GPP TSG RAN WG1 Meeting #69, Agenda Item: 7.5.4, R1-121951, Prague, Czech Republic, May 21-25, 2012, 3 pp.

* cited by examiner

METHODS, SYSTEMS AND DEVICES FOR DECOUPLED INTERFERENCE RANDOMIZATION FOR UPLINK REFERENCE SIGNALS

CROSS-REFERENCE TO RELATED APPLICATION

This non-provisional patent application claims priority to U.S. Provisional Application No. 61/650,660, filed May 23, 2012, entitled Decoupled Interference Randomization for Uplink Reference Signals, the disclosure of which is hereby incorporated herein by reference as if set forth fully herein.

TECHNICAL FIELD

Various embodiments described herein relate to radio frequency communications and, more particularly, to wireless communication networks and devices, and methods of operating the same.

BACKGROUND

Wireless communication networks are increasingly being used for wireless communications with various types of wireless terminals. The wireless network itself may include a plurality of wireless base stations, also commonly referred to as "base stations," "radio access nodes," "RAN nodes," "NodeBs," "eNodeBs" or simply as "nodes," that define a plurality of cells, and a core network that controls the base stations and interfaces the base stations with other wired and/or wireless networks. The nodes may be terrestrial and/or space-based. The nodes communicate with wireless terminals, also referred to as "User Equipment (UE)," "mobile stations," "user terminals," "terminals" or simply as "wireless devices," using radio resources that are allocated to the wireless network. The radio resources may be defined in terms of time (for example, in a Time Division Multiple Access (TDMA) system), frequency (for example, in a Frequency Division Multiple Access (FDMA) system) and/or code (for example, in a Code Division Multiple Access (CDMA) system). The nodes may use licensed and/or unlicensed frequency spectrum. Radio resources may be assigned to wireless devices by the wireless network upon initial communication and may be reassigned due to, for example, movement of the wireless devices, changing bandwidth requirements, changing network traffic, etc.

The approaches described in this section could be pursued, but are not necessarily approaches that have been previously conceived or pursued. Therefore, unless otherwise indicated herein, the approaches described in this section are not prior art to claims in this application and any application claiming priority from this application, and are not admitted to be prior art by inclusion of this section.

SUMMARY

Various embodiments described herein can provide methods of decoupling interference randomization for uplink reference signals in a wireless network. According to various embodiments described herein, reducing interference between reference signals from user equipments in a wireless network may include receiving a time shift value from a node in the wireless network. An interference randomization technique may be applied to a reference signal. A sequence may be generated based on the reference signal to which the interference randomization technique has been applied. Based on the received time shift value, a time shift may be applied to the sequence to derive a processed reference signal. The processed reference signal may be transmitted to the node.

In some embodiments, applying the time shift based on the time shift value may include determining a shifted slot index based on a slot index associated with a serving cell used by the user equipment and the time shift value. The sequence generated based on the reference signal may be indexed by the shifted slot index.

According to some embodiments, applying the time shift based on the time shift value may include comparing a Virtual Cell Identifier (VCID) for a serving cell of the user equipment with a Physical Cell Identifier (PCID) for the serving cell of the user equipment and selectively setting the time shift associated with the reference signal to the time shift value received from the network node, in response to determining that the VCID is different from the PCID.

In some embodiments, the time shift value may be received by the user equipment by Radio Resource Control (RRC) signaling. The reference signal may include a Physical Uplink Shared Channel (PUSCH) Demodulation Reference Signal (DMRS), a Physical Uplink Control Channel (PUCCH) DMRS, and/or a Sounding Reference Signal (SRS). The interference randomization technique may include Cyclic Shift Hopping (CSH) or Sequence Group Hopping (SGH). The processed reference signal may be transmitted on an uplink data or control channel.

It will be understood that various embodiments were described above in terms of methods of reducing interference between reference signals from user equipments in a wireless network for a wireless device. Analogous embodiments may be provided for a wireless device and/or a node of a wireless network according to any of the embodiments described herein. Specifically, a user equipment in a wireless network may include a transceiver configured to transmit on an uplink (UL) to a node and receive on a downlink (DL) from the node. The user equipment may include a processor configured to perform operations such as receiving, via the transceiver, a time shift value from the network node, applying an interference randomization technique to a reference signal, generating a sequence based on the reference signal to which the interference randomization technique has been applied, and applying a time shift based on the time shift value to the sequence to derive a processed reference signal. The transceiver may be configured to transmit the processed reference signal.

According to some embodiments described herein, a node of a wireless communication network may include a wireless transceiver and/or a processor. The processor may be configured to perform operations such as determining a time shift to be applied by a user equipment to a sequence generated based on applying an interference randomization technique to a reference signal. In some embodiments the processor may be configured to communicate the time shift from the node that was determined to the user equipment.

According to some embodiments, the node may be a first node and the reference signal may be a first reference signal. Determining the time shift may include coordinating determination of the time shift with a second node in the wireless communication network such that the first reference signal to which the time shift is applied is orthogonal to a second reference signal received by the second node. In some embodiments, the user equipment may be a first user equipment. The first reference signal may be received from the first user equipment associated with the first node and the second reference signal may be received from a second user equipment associated with the second node.

According to some embodiments, the processor may be configured to collect information related to one or more time shifts respectively associated with one or more user equipment potentially mutually interfering with the first user equipment. The processor may be configured to receive a processed reference signal from the first user equipment, where the processed reference signal is associated with the sequence to which the time shift has been applied. The processor may be configured to estimate an uplink channel associated with the first user equipment based on the received processed reference signal.

According to some embodiments, the time shift may be an integer number of time slots, frames and/or subframes. The reference signal may include a Physical Uplink Shared Channel (PUSCH) Demodulation Reference Signal (DMRS), a Physical Uplink Control Channel (PUCCH) DMRS, and/or a Sounding Reference Signal (SRS). The interference randomization technique may include Cyclic Shift Hopping (CSH) or Sequence Group Hopping (SGH).

According to some embodiments, communicating the time shift to the user equipment may include communicating the time shift using Radio Resource Control (RRC) signaling in a UE-specific fashion or in a cell-specific fashion.

DETAILED DESCRIPTION

1. Introduction

Various embodiments described herein can provide systems, methods and devices for reducing interference between reference signals from user equipments in a wireless network. Various embodiments described herein may be used, in particular with networks where enhanced receivers are used to handle high interference.

Various embodiments will now be described more fully hereinafter with reference to the accompanying drawings, in which examples of various embodiments are shown. This invention may, however, be embodied in many different forms and should not be construed as limited to the embodiments set forth herein. Rather, these embodiments are provided so that this disclosure will be thorough and complete, and will fully convey the scope of the present invention to those skilled in the art. It should also be noted that these embodiments are not mutually exclusive. Components from one embodiment may be tacitly assumed to be present/used in another embodiment.

For purposes of illustration and explanation only, these and other embodiments are described herein in the context of operating in a wireless network that communicates over radio communication channels with wireless terminals. It will be understood, however, that the present invention is not limited to such embodiments and may be embodied generally in any type of communication network. As used herein, a wireless device can include any device that receives data from a wireless communication network, and may include, but is not limited to, a mobile telephone ("cellular" telephone), laptop/portable computer, pocket computer, hand-held computer, desktop computer, a machine to machine (M2M) or MTC type device, a sensor with a wireless communication interface, etc.

The Universal Mobile Telecommunications System (UMTS) is a third generation mobile communication system, which evolved from the Global System for Mobile Communications (GSM), and is intended to provide improved mobile communication services based on Wideband Code Division Multiple Access (WCDMA) technology. UTRAN, short for UMTS Terrestrial Radio Access Network, is a collective term for the Node B's and Radio Network Controllers which make up the UMTS radio access network. Thus, UTRAN is essentially a radio access network using wideband code division multiple access for UEs.

The Third Generation Partnership Project (3GPP) has undertaken to further evolve the UTRAN and GSM based radio access network technologies. In this regard, specifications for the Evolved Universal Terrestrial Radio Access Network (E-UTRAN) are ongoing within 3GPP. The Evolved Universal Terrestrial Radio Access Network (E-UTRAN) comprises the Long Term Evolution (LTE) and System Architecture Evolution (SAE).

Note that although terminology from 3GPP ($3^{rd}$ Generation Partnership Project) LTE (Long Term Evolution) may be used herein to exemplify various embodiments described herein, this should not be seen as limiting the scope of the invention to only these systems. Other wireless systems, including WCDMA (Wideband Code Division Multiple Access), WiMax (Worldwide Interoperability for Microwave Access), UMB (Ultra Mobile Broadband), HSDPA (High-Speed Downlink Packet Access), GSM (Global System for Mobile Communications), etc., may also benefit from exploiting various embodiments disclosed herein.

Also note that terminology such as base station and UE should be considered non-limiting and does in particular not imply a certain hierarchical relation between the two; in general "base station" could be considered as device 1 and "UE" device 2, and these two devices communicate with each other over some radio channel.

Prior to describing various embodiments, a technical overview of LTE will be provided to facilitate understanding of various embodiments described herein.

1.1 Technical Overview

The description below focuses, for the sake of simplicity, on the UL of an LTE Rel-11 network, even though particular embodiments of the proposed solutions may be applied even to the downlink (DL) and to other communication protocols.

A "cell" is characterized in LTE by a "cell-ID," which affects several cell-specific algorithms and procedures. Sometimes the cell-ID for the serving cell of a specific User Equipment (UE) is referred to as Physical Cell-ID (PCID).

In addition, LTE networks are designed with the aim of enabling optional CoMP (Coordinated multipoint processing) techniques, where different sectors and/or cells operate in a coordinated way in terms of, e.g., scheduling and/or processing. An example is uplink (UL) CoMP where the signal originating from a single UE may be received at multiple reception points and jointly processed in order to improve the link quality. UL joint processing (also referred to as UL CoMP) allows transformation of what is regarded as inter-cell interference in a traditional deployment into useful signals. Therefore, LTE networks taking advantage of UL CoMP may be deployed with smaller cell size compared to traditional deployments in order to fully take advantage of the CoMP gains.

The LTE uplink (UL) is designed assuming coherent processing, i.e., the receiver is assumed to be able to estimate the radio channel from the transmitting user equipment (UE) and to take advantage of such information in the detection phase. Therefore, each transmitting UE sends a reference signal (RS) associated to each UL data or control channel (e.g., PUSCH and PUCCH). In case of PUSCH, one demodulation reference signal (DMRS) per slot is transmitted on the same bandwidth as the uplink data channel. In case of PUCCH, multiple PUCCH-RSs are transmitted and time multiplexed by the UE within each subframe, spanning the PUCCH bandwidth assigned to the UE.

Additional RS possibly transmitted by UEs consist of SRS, i.e., signals that are transmitted by a UE at predetermined time instances and over a predetermined bandwidth, in order to enable estimation of the UL channel properties at the network side.

RSs from different UEs within the same cell may potentially interfere with each other and, assuming synchronized networks, even with RS originated by UEs in neighboring cells. In order to limit the level of interference between RSs, different techniques have been introduced in different LTE releases in order to allow orthogonal or semi-orthogonal RSs. The design principle of LTE assumes orthogonal RS within each cell and semi-orthogonal RS among different cells (even though orthogonal RSs can be achieved for aggregates of cells by so called "sequence planning"). However, orthogonality of DMRS transmitted by UEs belonging to different cells is currently under discussion in the Rel-11 LTE standardization. A family of techniques for inter-cell DMRS orthogonality has been discussed. Some of these techniques rely on the possibility of coordinating the base sequence index (BSI) employed for RS generation by different UEs in different cells.

Another application in the UL of LTE is multi-user multiple input multiple output (MU-MIMO), where data transmissions on PUSCH from multiple UEs are coscheduled on at least partly overlapping bandwidth in the same subframe, within the same cell. The UEs are separated at the receiver side by exploiting multiantenna processing. In order to allow the receiver to resolve the signals from the coscheduled UEs, it is beneficial to assign the DMRS in an orthogonal fashion for such UEs. This may be achieved by assigning different OCC to the DMRS of the coscheduled UEs. If the coscheduled bandwidths are fully overlapping, CS separation of the DMRS for the different UEs may also be exploited.

Each DMRS is characterized by a group-index and a sequence-index, which define the so called base sequence index (BSI). BSIs are assigned in a cell-specific fashion in LTE Rel-8/9/10 and they are a function of the cell-ID. Different base sequences are semi-orthogonal, which implies that some inter-sequence interference is present in the general case. The DMRS for a given UE is only transmitted on the same bandwidth of PUSCH and the base sequence is correspondingly generated so that the RS signal is a function of the PUSCH bandwidth. For each subframe, 2 RSs are transmitted, one per slot. In LTE Rel-11 it is likely that UE-specific assignment of BSIs will be introduced.

Orthogonal DMRS can be achieved by use of cyclic shift (CS) in LTE Rel-8/9 or by CS in conjunction with orthogonal OCC in LTE Rel-10. CS is a method to achieve orthogonality based on cyclic time shifts, under certain propagation conditions, among RS generated from the same base sequence. Only 8 different CS values can be dynamically indexed in LTE Rel-8/9/10, even though in practice less than 8 orthogonal DMRS can be achieved depending on channel propagation properties (without considering OCC in this example). Even though CS is effective in multiplexing DMRSs assigned to fully overlapping bandwidths, orthogonality is lost when the bandwidths differ and/or when the interfering UE employs another base sequence.

In order to increase interference randomization between different UEs (e.g., at different cells), a pseudo-random offset to the CS values is applied (CS hopping (CSH)). The randomization pattern is cell-specific in LTE Rel-8/9/10. A different CS offset is in general applied in each slot and it is known at both UE and eNB sides, so that it can be compensated at the receiver side during channel estimation.

OCC is a multiplexing technique based on orthogonal time domain codes, operating on the 2 RS provided for each UL subframe. The OCC code [1 −1] is able to suppress an interfering DMRS as long as its contribution after the matched filter at the receiver is identical on both DMRSs of the same subframe. Similarly, the OCC code [1 1] is able to suppress an interfering DMRS as long as its contribution after the eNB matched filter has an opposite sign respectively on the two RSs of the same subframe. It is straightforward to assume that CS and OCC will be supported also by LTE Rel-11 UEs.

While base-sequences are assigned in a semi-static fashion, CS and OCC are dynamically assigned as part of the scheduling grant for each UL PUSCH transmission. Even though joint processing techniques may be applied for PUSCH, channel estimates based on DMRS are typically performed in an independent fashion at each reception point, even in case of UL CoMP. Therefore, it is crucial to keep the interference level at an acceptably low level, especially for RSs.

In case of SRS, the RSs are also generated according to a BSI (which may differ from the DMRS BSI for some UEs). Different SRS may be multiplexed by use of CS and COMBs. A COMB indicates a specific interleaved mapping of the RS to a subset of subcarriers. SRS assigned to different COMBS (i.e., non overlapping sets of subcarriers) are thus ideally orthogonal.

In case of PUCCH-RS, one or more RSs per slot are generated, depending on the PUCCH format and other parameters. PUCCH-RS for different UEs are separated by use of CS and OCC, which spans over each slot. Also PUCCH-RS are generated according to a BSI that may in general differ from the DMRS BSI.

In order to minimize the impact of interference peaks on RSs, interference randomization techniques have been introduced in LTE. In particular, sequence hopping and group hopping (jointly referred to as SGH) are BSI randomization techniques which operate on a slot level with a cell-specific pattern, which is a function at least of the cell-ID and sequence index. In case of SRS, SGH operates on a subframe level, since only one SRS symbol per subframe is typically generated (with the exception of certain Uplink Pilot Time Slot (UpPTS) configurations).

SGH can be enabled/disabled on a cell-basis by use of the cell-specific parameters Group-hopping-enabled and Sequence-hopping-enabled, affecting respectively group hopping and sequence hopping. For LTE Rel-10 UEs, SGH can be disabled in a UE specific fashion by setting the UE-specific RRC parameter Disable-sequence-group-hopping. When SGH is enabled, it implies BSI randomization for UL RSs, and in particular for DMRS, PUCCH-RS and SRS.

In the context of standardization of LTE Rel-11, a number of enhancements for UL reference signals (RS) are being discussed. In particular, UE specific assignments of the BSI and CSH pattern initialization are likely to be introduced, for UL DMRS as well as other UL RS such as SRS and PUCCH DMRS. When UE specific BSI is configured for a UE, the BSI is derived as a function of a UE-specific virtual cell-ID (VCID) instead of the PCID. The VCID is also employed for initialization of sequence generators for SGH. Similarly, the initialization parameter for CSH ($c_{init}$ in the LTE Rel-10 specifications 36.211) is derived from some UE specific parameter, where the details are still to be agreed. It is understood that the same pseudo-random generators as for LTE Ref-10 are going to be reused for LTE Rel-11 UEs, for the purpose of CSH and SGH. Different UE specific initializations (and consequently BSI and hopping patterns) may be defined for different RS types, such as PUSCH DMRS, PUCCH DMRS and SRS.

UE-specific BSI and CSH may be exploited, e.g., for achieving inter-cell orthogonality between RSs transmitted by different UEs in the UL. By assigning the same CSH to interfering UEs, it is possible to achieve inter-cell orthogonality by use of OCC. If also the BSIs are aligned, CS may also be exploited for orthogonality.

Several methods for handling interference have been discussed in LTE, especially for the DL. One possibility is to deploy the network with a predefined time offset between different nodes. If the time offset is carefully chosen (typically an integer number of subframes), it is possible to avoid mutual interference between important control signals (such as synchronization signals, PSS/SSS) in the DL. This method will be termed as subframe shift (SS) in the following.

1.2 Problems Addressed

In case of SS and UL CoMP, the network may not be able to align the BSI for interfering UEs belonging to different cells because the BSI generators are not aligned in time in case SGH is enabled. A similar problem happens in case the network wished to align CSH in time between interfering UEs belonging to different cells. The above issue results in limited network flexibility and reduced occasions for pairing of UEs with orthogonal RSs. The above applies at least to PUSCH DMRS, PUCCH DMRS and SRS.

2. Basic Concept of the Proposed Solutions

Figure 5:
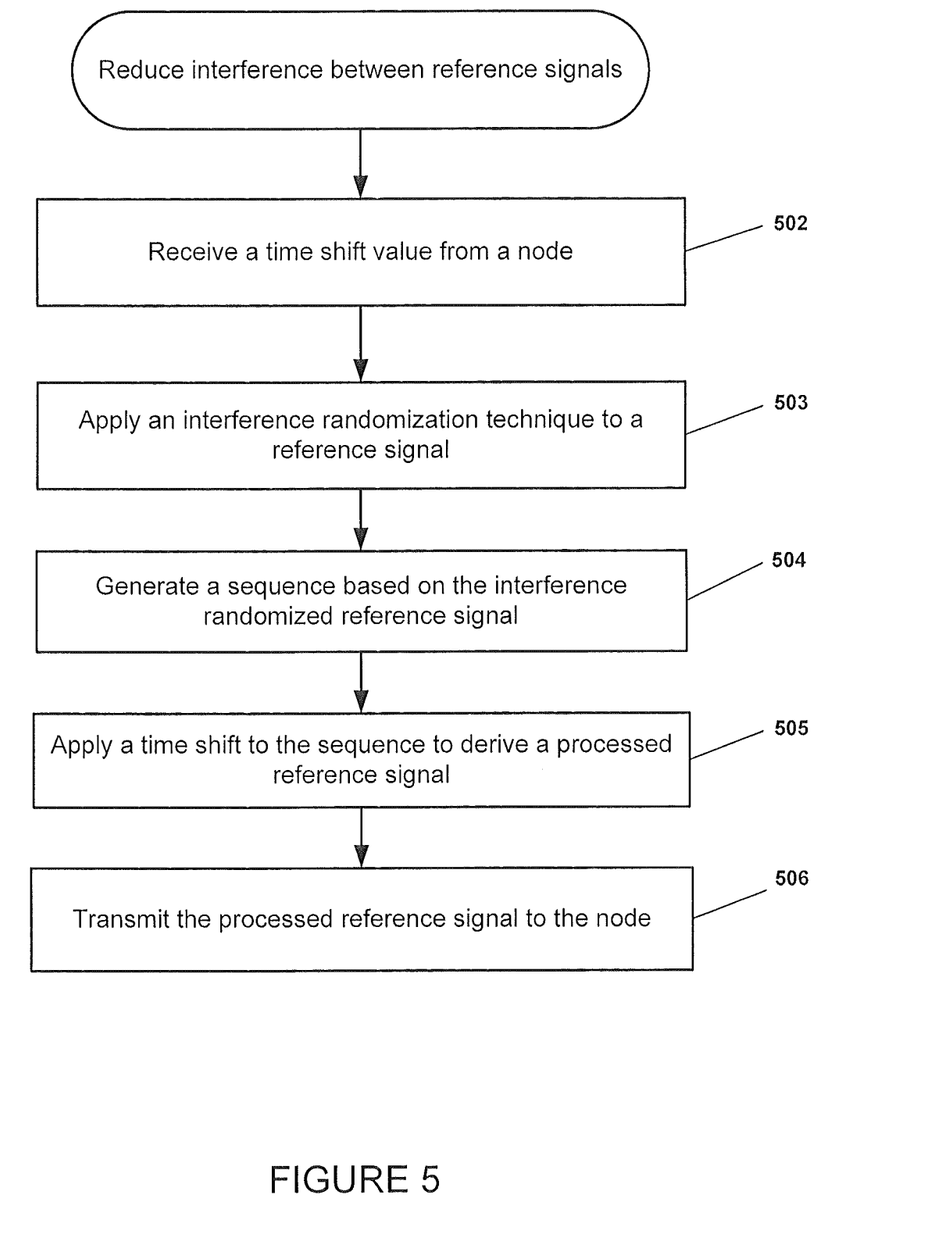
FIGS. 5 and 6 are flowcharts of operations that may be performed to reduce interference between reference signals according to various embodiments described herein.

The proposed solutions introduce a new UE specific offset that may be signaled to the UE for enabling proper time shift of the pseudo-random sequences generated for CSH and SGH (Block 504 of FIG. 5).

3.0 Detailed Technical Description of Proposed Solutions

The present disclosure proposes time shifting the output of sequence generators for PUSCH DMRS, PUCCH DMRS and SRS. In particular, the outputs of the generators for CSH and SGH may be shifted. The shift may be expressed, e.g., as an integer number of slots as compared to the slot number associated to the serving cell for a given UE. The time shift may consist of a delay or an anticipation of the output of the CSH and SGH sequence generators as compared to the output expected in the slot corresponding to the serving cell for a given UE. The time shift may be signaled by RRC signaling in a UE-specific or cell-specific fashion.

Considering that orthogonality between PUSCH DMRS may more easily be achieved when the subframe index is aligned between orthogonal UEs (as compared to the slot index) and considering that in LTE each subframe comprises two slots, it may be possible to signal a time shift consisting of an integer number of subframes. However, since the LTE specifications are mainly written by employing the concept of slot, numbered from 0 to 19 within a radio frame, the UE may be expected to apply the corresponding time offset expressed in number of slots.

Even though the slot index may be shifted, the sequence generators for CSH and SGH may be reset at the beginning of each radio frame, where the radio frame may be based on the serving cell. This may simplify the reconfiguration process (e.g., modification of initialization for CSH and SGH) for the network and UE. Furthermore, in order to further simplify reconfiguration of CSH and SGH initialization, in particular embodiments, the UE may apply the updated time shift at the beginning of the first radio frame following the RRC reconfiguration of at least the time shift. By doing so, the reconfiguration of the initialization and the time shift may happen at the same time instance (beginning of the radio frame following RRC reconfiguration), thus potentially avoiding transmission of RSs that are only partially reconfigured with respect to CSH and SGH.

Figure 6:
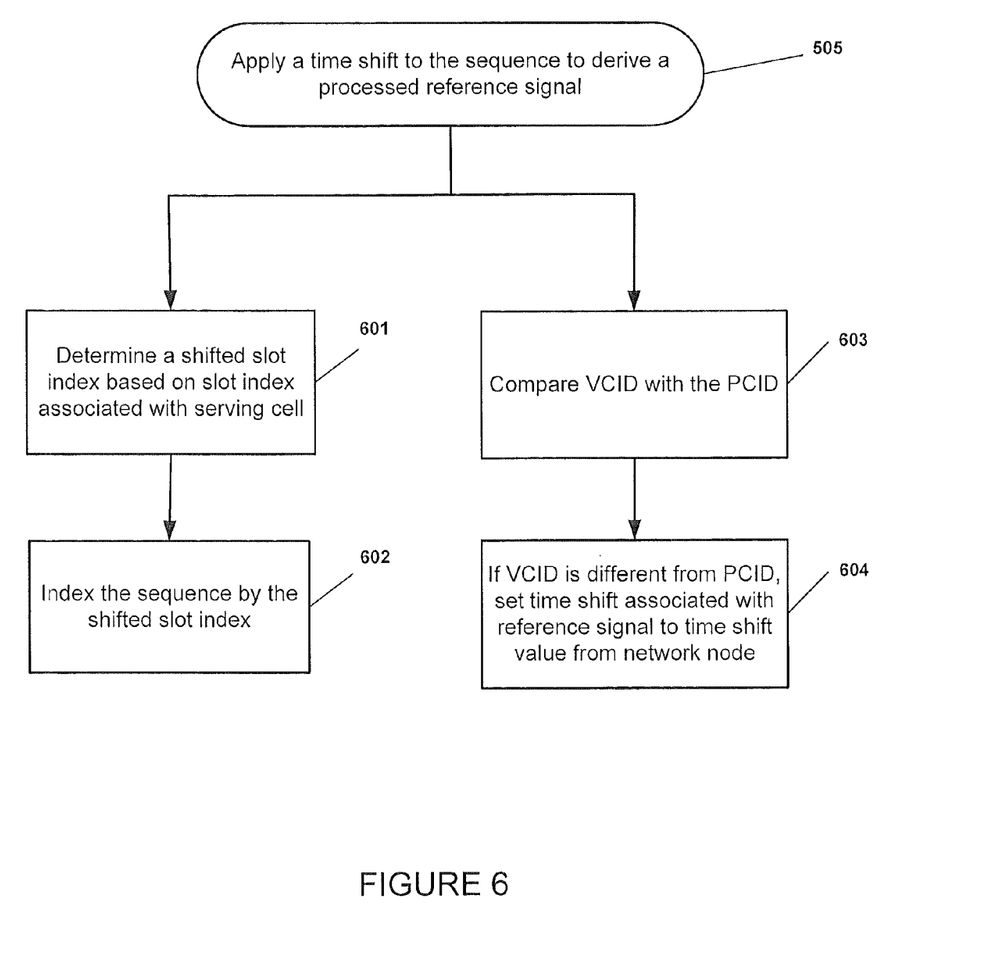

In particular embodiments, the UE compares the VCID and the PCID for a given UL RS type (e.g., for PUSCH DMRS, PUCCH DMRS or SRS) (Block 603 of FIG. 6). If the PCID and VCID coincide for a given RS type, the time shift for that RS type may be set to 0. In another example, if the PCID and VCID coincide for a given RS type, the time shift for that RS type may be set to a cell-specific value signaled by RRC. If the VCID and the PCID are different, the UE may employ the UE-specific time-shift value as signaled by RRC. By doing this, the UE may be reconfigured from using {VCID, UE specific time shift} to {PCID, cell specific time shift} without any need to reconfigure both the cell-ID and the time shift (Block 604 of FIG. 6). In another example such a rule may be exploited in case of fallback operation, i.e., when the UE is instructed to operate as a legacy UE, e.g., during a transmission mode reconfiguration or when entering a new network.

In the case where multiple RS configurations may be defined for a UE (e.g., for PUSCH DMRS, PUCCH DMRS or SRS), an individual time shift may be configured for each RS configuration. This would allow the different RS configurations to match the time shift of different cells for inter cell orthogonality purposes.

In certain embodiments, the network collects information about the time shifts associated with UEs potentially mutually interfering with a given UE. The network may then configure at least one RS configuration for at least some RS type for the given UE so that the sequence generators for CSH and/or SGH may be time aligned (on a subframe basis) with the generators in the mutually interfering UE.

In some embodiments, a specific time shift value may be defined respectively for CSH and SGH, where one of the two time shifts may equal 0. One example application is PUSCH DMRS where OCC orthogonality between cells may be exploited. In that case, it may be convenient to align the CSH patterns but not the BSI generation patterns (SGH) in order to exploit maximum randomization of the BSIs between cells (Block 503 of FIG. 5).

In certain embodiments, a common time shift may be applied to both CSH and SOH sequences (Block 505 of FIG. 5). [0056]As one example, the UE specific shifted slot index IV may be defined for a RS configuration as:

$$n_s' = \mathrm{mod}(n_s + \Delta, 20)$$

where $\Delta$ is the time offset defined for a UE and $n_s$ is the slot index for the serving cell (Block 601 of FIG. 6). $n_s'$ may be used to index the output of the CSH and/or SGH generators (Block 602 of FIG. 6).

Thus, in particular embodiments, a UE may receive a time offset from a network node (e.g., a serving base station). The UE may calculate a shifted slot index based on the time offset and a slot index for a serving cell associated with the UE (Block 601 of FIG. 6). The UE may determine a CSH parameter and/or an SGH parameter based on the shifted slot index (e.g., by adjusting the output of a CSH generator and/or an SGH generator). The CSH parameter or SGH parameter may represent a parameter associated with CSH or SGH, respectively, such as a CSH or SGH pattern. The UE may transmit a reference signal using the CSH and/or SGH parameter (Block 506 of FIG. 5).

Additionally, in particular embodiments, a network node (e.g., a base station) may be configured to transmit a UE-specific offset to one or more UEs served by the base station (Block 502 of FIG. 5). The network node may receive a respective RS transmitted by one of the UEs using a CSH and/or SGH parameter that the UE may have determined based on the UE-specific offset. The network node may estimate an uplink channel associated with the relevant UE based on the received RS. The network node may use the channel estimate in communication with the relevant UE. For example, the network node may demodulate certain transmissions from the UE using the channel estimate and/or may perform channel-dependent scheduling for the UE or link adaptation using the channel estimate.

Figure 1:
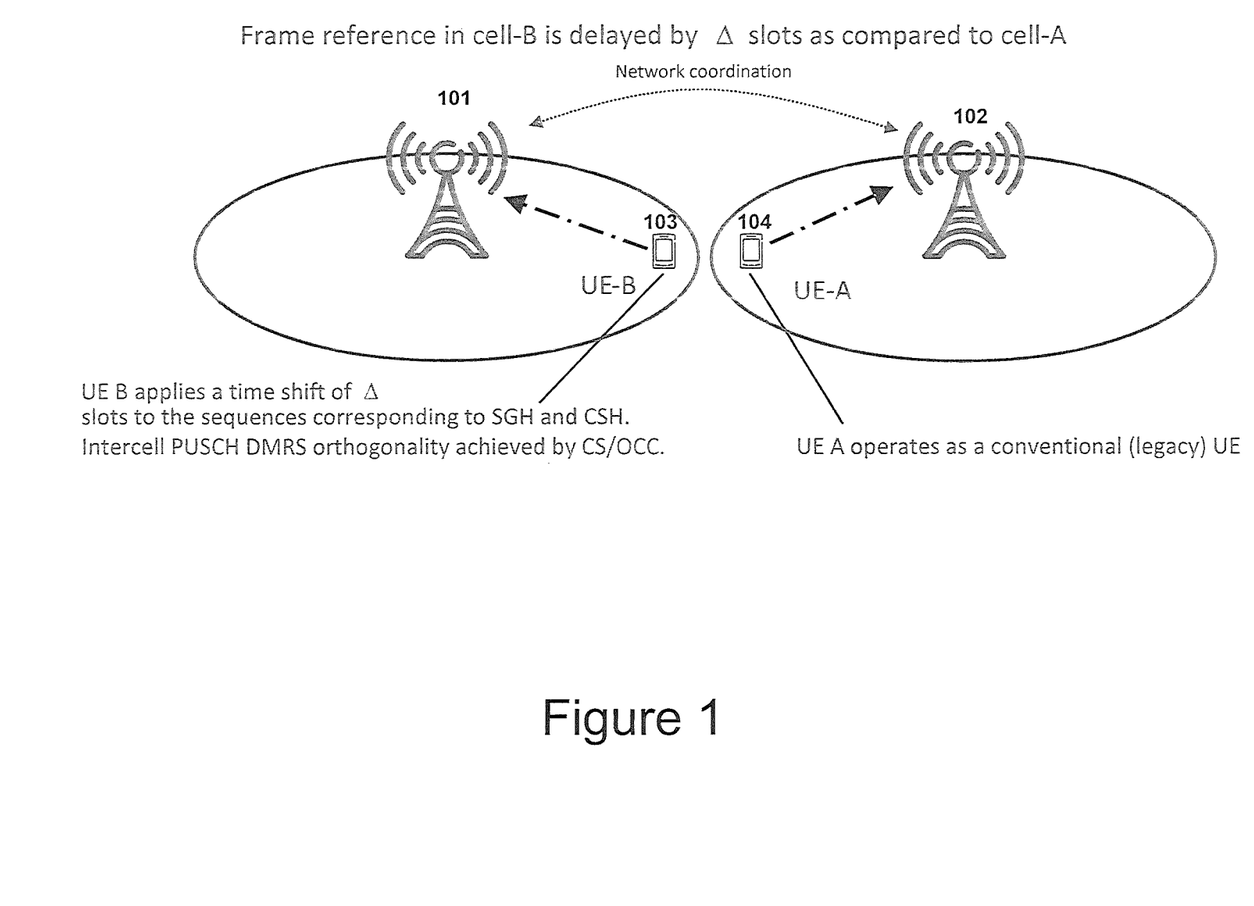
FIG. 1 illustrates an example of deployment and network configuration for PUSCH DMRS with a time shift for CSH and SGH sequences according to various embodiments described herein.

An example of network configuration for UL CoMP and SS is provided in FIG. 1. In this example, the SGH and CSH for a legacy (e.g., LTE Rel-10) UE-A 104 may be matched by a LTE Rel-11 UE-B 103, by time-shifting the PUSCH DMRS generation for UE-B 104. Inter cell orthogonality may be achieved and the advantages of SS in the DL may be still exploited.

With the proposed control functionality the network may be able to configure inter-cell orthogonal UL RS even in case of SS.

4. Example Implementations

Figure 2:
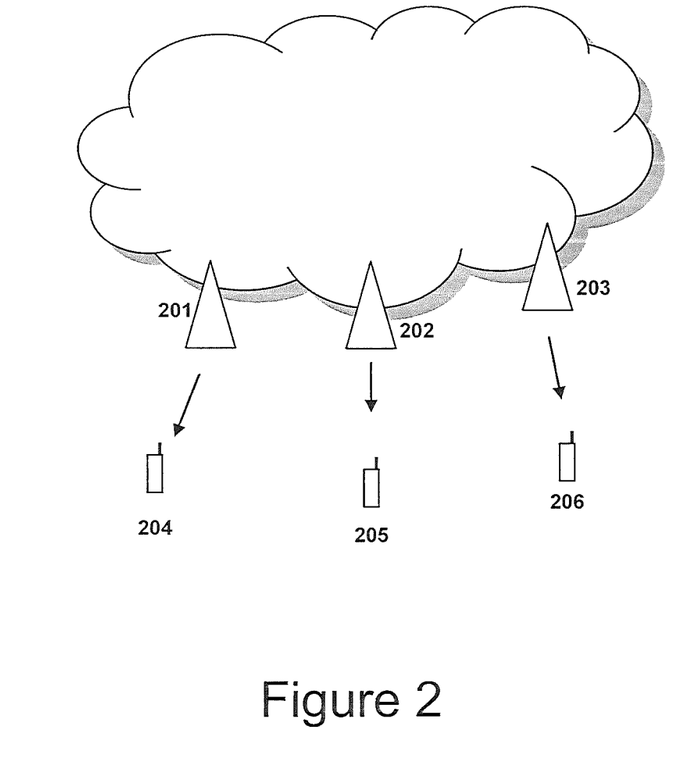
FIG. 2 illustrates an example wireless communication network that may be used with embodiments described herein.

Although the described solutions may be implemented in any appropriate type of telecommunication system supporting suitable communication standards and using suitable components, particular embodiments of the described solutions may be implemented in an LTE network, such as that illustrated in FIG. 2.

As shown in FIG. 2, the example network may include one or more instances of user equipment (UEs) 204, 205 and/or 206, and one or more base stations 201, 202, and/or 203 capable of communicating with these UEs 204, 205, and/or 206, along with any additional elements suitable to support communication between UEs or between a UE and another communication device (such as a landline telephone). Although the illustrated UEs 204, 205, and/or 206 may represent communication devices that include any suitable combination of hardware and/or software, these UEs may, in particular embodiments, represent devices such as the example UE 301 illustrated in greater detail by FIG. 3. Similarly, although the illustrated base stations may represent network nodes that include any suitable combination of hardware and/or software, these base stations may, in particular embodiments, represent devices such as the example base station 401 illustrated in greater detail by FIG. 4.

Figure 3:
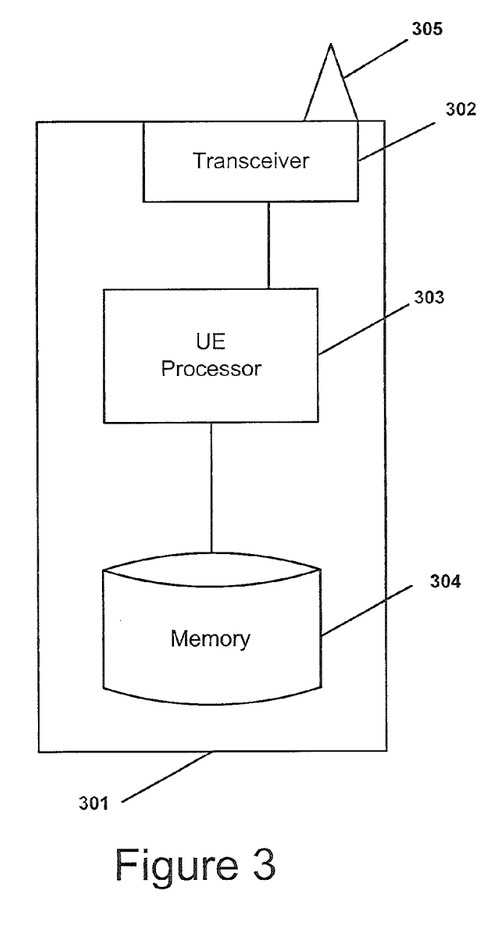
FIG. 3 is a block diagram of a user equipment that may be used with embodiments described herein.

As shown in FIG. 3, the example UE includes a processor 303, a memory 304, a transceiver 302, and an antenna 305. In particular embodiments, some or all of the functionality described above as being provided by mobile communication devices or other forms of UE may be provided by the UE processor 303 executing instructions stored on a computer-readable medium, such as the memory 304 shown in FIG. 3. Alternative embodiments of the UE may include additional components beyond those shown in FIG. 3 that may be responsible for providing certain aspects of the UE's functionality, including any of the functionality described above and/or any functionality necessary to support the solution described above.

Figure 4:
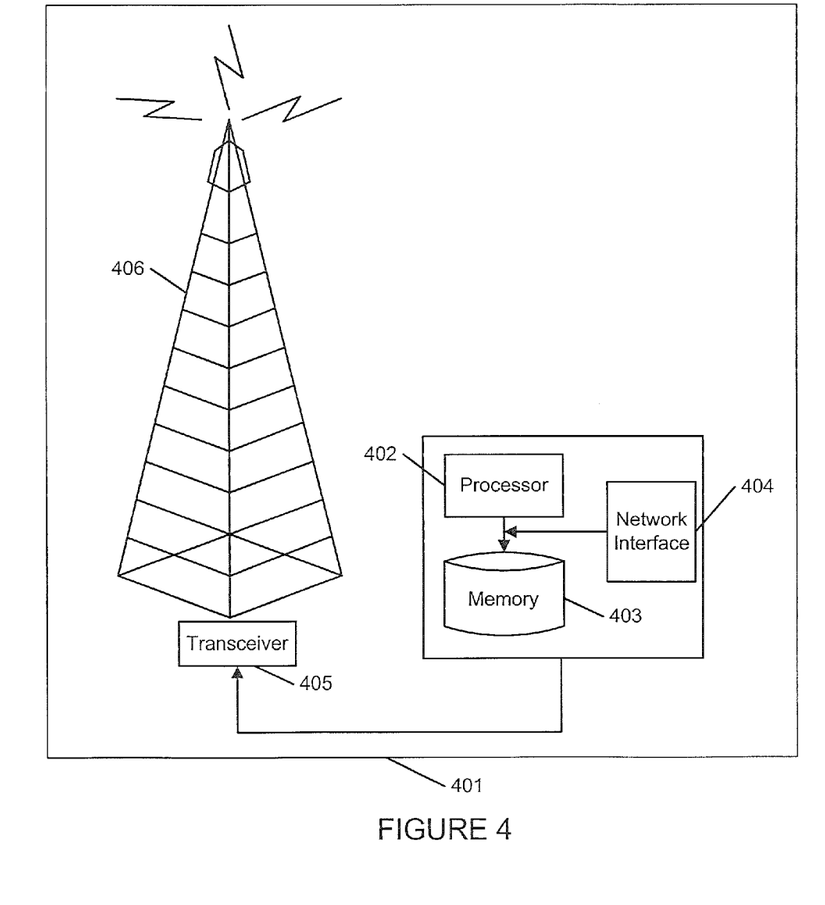
FIG. 4 is a block diagram of a node or base station that may be used with embodiments described herein.

As shown in FIG. 4, the example base station 401 includes a processor 402, a memory 403, a transceiver 405, and an antenna 406. In particular embodiments, some or all of the functionality described above as being provided by a mobile base station, a base station controller, a node B, an enhanced node B, and/or any other type of mobile communications node may be provided by the base station processor executing instructions stored on a computer-readable medium, such as the memory 403 shown in FIG. 4. Alternative embodiments of the base station may include additional components responsible for providing additional functionality, including any of the functionality identified above and/or any functionality necessary to support the solution described above.

ABBREVIATIONS

BSI Base Sequence Index
CoMP Coordinated Multi Point
CS Cyclic Shift
OCC Orthogonal Cover Code
RS Reference Signal
SGH Sequence Group Hopping
SRS Sounding Reference Signal
DL Downlink
UL Uplink Various embodiments were described herein with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

It will be understood that, when an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Furthermore, "coupled", "connected", "responsive", or variants thereof as used herein may include wirelessly coupled, connected, or responsive. Like numbers refer to like elements throughout. The terminology used herein is for the purpose of describing particular embodiments only and is not intended to be limiting of the invention. As used herein, the singular forms "a", "an" and "the" are intended to include the plural forms as well, unless the context clearly indicates otherwise. Well-known functions or constructions may not be described in detail for brevity and/or clarity.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. Moreover, as used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

Various embodiments described herein can operate in any of the following Radio Access Technologies: Advanced Mobile Phone Service (AMPS), ANSI-136, Global Standard for Mobile (GSM) communication, General Packet Radio Service (GPRS), enhanced data rates for GSM evolution (EDGE), DCS, PDC, PCS, code division multiple access (CDMA), wideband-CDMA, CDMA2000, Universal Mobile Telecommunications System (UMTS), 3GPP LTE (3rd Generation Partnership Project Long Term Evolution) and/or 3GPP LTE-A (LTE Advanced). For example, GSM operation can include reception/transmission in frequency ranges of about 824 MHz to about 849 MHz and about 869 MHz to about 894 MHz. EGSM operation can include reception/transmission in frequency ranges of about 880 MHz to about 914 MHz and about 925 MHz to about 960 MHz. DCS operation can include transmission/reception in frequency ranges of about 1410 MHz to about 1785 MHz and about 1805 MHz to about 1880 MHz. PDC operation can include transmission in frequency ranges of about 893 MHz to about 953 MHz and about 810 MHz to about 885 MHz. PCS operation can include transmission/reception in frequency ranges of about 1850 MHz to about 1910 MHz and about 1930 MHz to about 1990 MHz, 3GPP LTE operation can include transmission/reception in frequency ranges of about 1920 MHz to about 1980 MHz and about 2110 MHz to about 2170 MHz. Other Radio Access Technologies and/or frequency bands can also be used in various embodiments described herein. All these systems are designed to operate in a variety of bands typically known as the International Mobile Telecommunications (IMT) bands that are defined by the International Telecommunications Union-Radio Communication Bureau (ITU-R) and can, in general, be located in frequency ranges between 200 MHz and 5 GHZ within the current state of the art. It should, however, be noted that various embodiments described herein are equally applicable for any radio system, and are not restricted in any way to the IMT bands in any way.

For purposes of illustration and explanation only, various embodiments of the present invention were described herein in the context of wireless devices that are configured to carry out cellular communications (e.g., cellular voice and/or data communications). It will be understood, however, that the present invention is not limited to such embodiments and may be embodied generally in any wireless communication terminal that is configured to transmit and receive according to one or more radio access technologies.

As used herein, the term "wireless device" includes cellular and/or satellite radiotelephone(s) with or without a display (text/graphical); Personal Communications System (PCS) terminal(s) that may combine a radiotelephone with data processing, facsimile and/or data communications capabilities; Personal Digital Assistant(s) (PDA) or smart phone(s) that can include a radio frequency transceiver and a pager, Internet/Intranet access, Web browser, organizer, calendar and/or a global positioning system (GPS) receiver; and/or conventional laptop (notebook) and/or palmtop (netbook) computer(s) or other appliance(s), which include a radio frequency transceiver. As used herein, the term "wireless device" also includes any other radiating user device that may have time-varying or fixed geographic coordinates and/or may be portable, transportable, installed in a vehicle (aeronautical, maritime; or land-based) and/or situated and/or configured to operate locally and/or in a distributed fashion over one or more terrestrial and/or extra-terrestrial location(s). Finally, the term "node" includes any fixed, portable and/or transportable device that is configured to communicate with one or more user equipment and a core network, and includes, for example, terrestrial cellular base stations (including microcell, picocell, wireless access point and/or ad hoc communications access points) and satellites, that may be located terrestrially and/or that have a trajectory above the earth at any altitude.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, if used herein, the common abbreviation "e.g.", which derives from the Latin phrase exempli gratia, may be used to introduce or specify a general example or examples of a previously mentioned item, and is not intended to be limiting of such item. If used herein, the common abbreviation "i.e.", which derives from the Latin phrase id est, may be used to specify a particular item from a more general recitation.

Various embodiments were described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by processor circuitry. These computer program instructions may be provided to processor circuitry of a general purpose computer circuit, special purpose computer circuit such as a digital processor, and/or other programmable data processor circuit to produce a machine, such that the instructions, which execute via the processor circuitry of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s). These computer program instructions may also be stored in a computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/BlueRay).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks.

Accordingly, embodiments of the present invention may be embodied in hardware and/or in software (including firmware, resident software, micro-code, etc.) that runs on a processor such as a digital signal processor, which may collectively be referred to as "processor circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Moreover, although some of the diagrams include arrows on communication paths to show a primary direction of communication, it is to be understood that communication may occur in the opposite direction to the depicted arrows.

Many different embodiments were disclosed herein, in connection with the following description and the drawings. It will be understood that it would be unduly repetitious and obfuscating to literally describe and illustrate every combination and subcombination of these embodiments. Accordingly, the present specification, including the drawings, shall be construed to constitute a complete written description of all combinations and subcombinations of the embodiments described herein, and of the manner and process of making and using them, and shall support claims to any such combination or subcombination.

In the drawings and specification, there have been disclosed embodiments of the invention and, although specific terms are employed, they are used in a generic and descriptive sense only and not for purposes of limitation, the scope of the invention being set forth in the following claims.

What is claimed is:

1. A method of reducing interference between reference signals from user equipments in a wireless network, the method comprising:
    receiving a time shift value from a node in the wireless network;
    applying an interference randomization technique to a reference signal;
    generating a sequence based on the reference signal to which the interference randomization technique has been applied;
    comparing a Virtual Cell Identifier (VCID) for a serving cell of the user equipment with a Physical Cell Identifier (PCID) for the serving cell of the user equipment;
    selectively setting a time shift associated with the reference signal to the time shift value received from the network node, in response to determining that the VCID is different from the PCID;
    applying the time shift to the sequence to derive a processed reference signal; and
    transmitting the processed reference signal to the node.

2. The method according to claim 1, wherein applying the time shift comprises:
    determining a shifted slot index based on a slot index associated with a serving cell used by the user equipment and the time shift value; and
    indexing the sequence generated based on the reference signal by the shifted slot index.

3. The method according to claim 1, wherein the time shift value is received by the user equipment by Radio Resource Control (RRC) signaling.

4. The method according to claim 1, wherein the reference signal comprises a Physical Uplink Shared Channel (PUSCH) Demodulation Reference Signal (DMRS), a Physical Uplink Control Channel (PUCCH) DMRS, and/or a Sounding Reference Signal (SRS).

5. The method according to claim 1, wherein the interference randomization technique comprises Cyclic Shift Hopping (CSH) or Sequence Group Hopping (SGH).

6. The method according to claim 1, wherein the processed reference signal is to be transmitted on an uplink data or control channel.

7. A user equipment comprising:
    a transceiver configured to transmit on an uplink to a node and receive on a downlink from the node; and
    a processor configured to perform operations comprising:
        receiving, via the transceiver, a time shift value from the network node;
        applying an interference randomization technique to a reference signal;
        generating a sequence based on the reference signal to which the interference randomization technique has been applied;
        comparing a Virtual Cell Identifier (VCID) for a serving cell of the user equipment with a Physical Cell Identifier (PCID) for the serving cell of the user equipment;
        selectively setting a time shift associated with the reference signal to the time shift value received from the network node, in response to determining that the VCID is different from the PCID; and
        applying the time shift to the sequence to derive a processed reference signal,
    wherein the transceiver is further configured to transmit the processed reference signal.

8. The user equipment according to claim 7, wherein applying the time shift associated with the reference signals to the sequence comprises:
    determining a shifted slot index based on a slot index associated with a serving cell used by the user equipment and the time shift value; and
    indexing the sequence generated based on the reference signal by the shifted slot index.

9. The user equipment according to claim 7, wherein the time shift value is received by the user equipment by Radio Resource Control (RRC) signaling.

10. The user equipment according to claim 7, wherein the reference signal comprises a Physical Uplink Shared Channel (PUSCH) Demodulation Reference Signal (DMRS), a Physical Uplink Control Channel (PUCCH) DMRS, and/or a Sounding Reference Signal (SRS).

11. The user equipment according to claim 7, wherein the interference randomization technique comprises Cyclic Shift Hopping (CSH) or Sequence Group Hopping (SGH).

12. The user equipment according to claim 7, wherein the processed reference signal is to be transmitted on an uplink data or control channel.

\* \* \* \* \*

UNITED STATES PATENT AND TRADEMARK OFFICE
CERTIFICATE OF CORRECTION

PATENT NO. : 9,107,223 B2  
APPLICATION NO. : 13/896893  
DATED : August 11, 2015  
INVENTOR(S) : Sorrentino Page 1 of 1

It is certified that error appears in the above-identified patent and that said Letters Patent is hereby corrected as shown below:

On Title Page 2, item (56), under "OTHER PUBLICATIONS", in Column 1, Line 2, delete "7.5.6.1,1," and insert -- 7.5.6.1.1, --, therefor.

In the specification

In Column 7, Line 12, delete "Ref-10" and insert -- Rel-10 --, therefor.

In Column 8, Lines 60-67, delete "[0056]As..........FIG. 6)." and insert -- As one example, the UE specific shifted slot index $n_s'$ may be defined for a RS configuration as:
$n_s'=mod(n_s+\Delta,20)$
where $\Delta$ is the time offset defined for a UE and $n_s$ is the slot index for the serving cell (Block 601 of FIG. 6). $n_s'$ may be used to index the output of the CSH and/or SGH generators (Block 602 of FIG. 6). --, at Line 61, as a new Paragraph.

In Column 9, Line 31, delete "UE-B 104." and insert -- UE-B 103. --, therefor.

In Column 11, Line 35, delete "1990 MHz," and insert -- 1990 MHz. --, therefor.

In Column 12, Line 6, delete "maritime;" and insert -- maritime, --, therefor.

Signed and Sealed this  
Seventh Day of June, 2016

Michelle K. Lee  
*Director of the United States Patent and Trademark Office*